US006293176B1

United States Patent
Talesky

(10) Patent No.: US 6,293,176 B1
(45) Date of Patent: Sep. 25, 2001

(54) DUAL SLIDING RAIL AND LOCKING MECHANISM FOR USE WITH A TABLE SAW

(75) Inventor: Mark S. Talesky, Chicago, IL (US)

(73) Assignee: S-B Power Tool Company, Chicago, IL (US)

(*) Notice: Subject to any disclaimer, the term of this patent is extended or adjusted under 35 U.S.C. 154(b) by 0 days.

(21) Appl. No.: 09/329,141

(22) Filed: Jun. 9, 1999

(51) Int. Cl.⁷ ........................................................ B26D 7/06
(52) U.S. Cl. .......................... 83/438; 83/468.7; 83/477.2; 144/287; 144/286.1
(58) Field of Search .............................. 83/435.19, 471.3, 83/477, 477.2, 468.2, 468.7; 144/286.1, 287; 269/318

(56) References Cited

U.S. PATENT DOCUMENTS

| 1,938,548 | 12/1933 | Tautz ........................... 143/174 |
| 2,572,333 | 10/1951 | Greitzer ......................... 45/68.3 |
| 3,695,189 | 10/1972 | Felder, Jr. ..................... 108/65 |
| 4,206,910 | * 6/1980 | Biesemeyer ................... 269/236 |
| 4,209,045 | 6/1980 | Bassett ............................ 144/1 |
| 4,297,952 | 11/1981 | Zagaroli .......................... 108/83 |
| 4,566,510 | * 1/1986 | Bartlett et al. ................. 83/477.2 |
| 4,677,920 | 7/1987 | Eccardt ........................... 108/69 |
| 4,726,405 | * 2/1988 | Bassett ........................... 144/287 |
| 4,798,113 | 1/1989 | Viazanko ....................... 83/471.3 |
| 4,817,693 | * 4/1989 | Schuler ......................... 144/359 |
| 4,887,653 | 12/1989 | Thomas ......................... 144/286 |
| 4,915,034 | 4/1990 | Grabe et al. ................... 108/65 |
| 4,955,941 | 9/1990 | Rousseau ........................ 108/65 |
| 5,115,847 | 5/1992 | Taber ............................. 144/287 |
| 5,116,249 | 5/1992 | Shiotani et al. ............. 83/435.001 |
| 5,181,446 | * 1/1993 | Theising ........................ 83/477.2 |
| 5,320,150 | 6/1994 | Everts et al. .................. 144/287 |
| 5,379,815 | 1/1995 | Brazell et al. ................. 144/287 |
| 5,379,816 | 1/1995 | Charlton ........................ 144/287 |
| 5,421,231 | 6/1995 | Break et al. .................. 83/471.3 |
| 5,518,053 | 5/1996 | Robison ....................... 144/286.1 |
| 5,819,671 | 10/1998 | Ocampo .......................... 108/64 |
| 5,931,209 | * 8/1999 | Chang ........................... 144/287 |
| 5,988,243 | * 11/1999 | Ayala et al. ................... 144/287 |
| 6,058,990 | * 5/2000 | Kent ............................. 83/468.3 |

\* cited by examiner

Primary Examiner—M. Rachuba
(74) Attorney, Agent, or Firm—Gardner, Carton & Douglas

(57) ABSTRACT

A table saw has a frame, an upper surface and an auxiliary table and having a dual sliding rail mechanism so that the auxiliary table moves between a first position adjacent the upper surface and a second position separated from the upper surface. The dual sliding rail mechanism includes support brackets that are secured to the front and rear edge surfaces of the table saw, mounting brackets that are connected to the front and rear edge surfaces of the auxiliary table and a front and rear rail having channels that slide over the support brackets and which are secured to the auxiliary table by the mounting brackets. A locking mechanism secures the auxiliary table in any position between the first and second position. The locking mechanism has a front and rear locking plate that slides within the channels and a lever to move the locking plates between a released position where the rails slide over the support brackets and a locked position where the locking plates secure the auxiliary table in a position between the first and second positions.

20 Claims, 7 Drawing Sheets

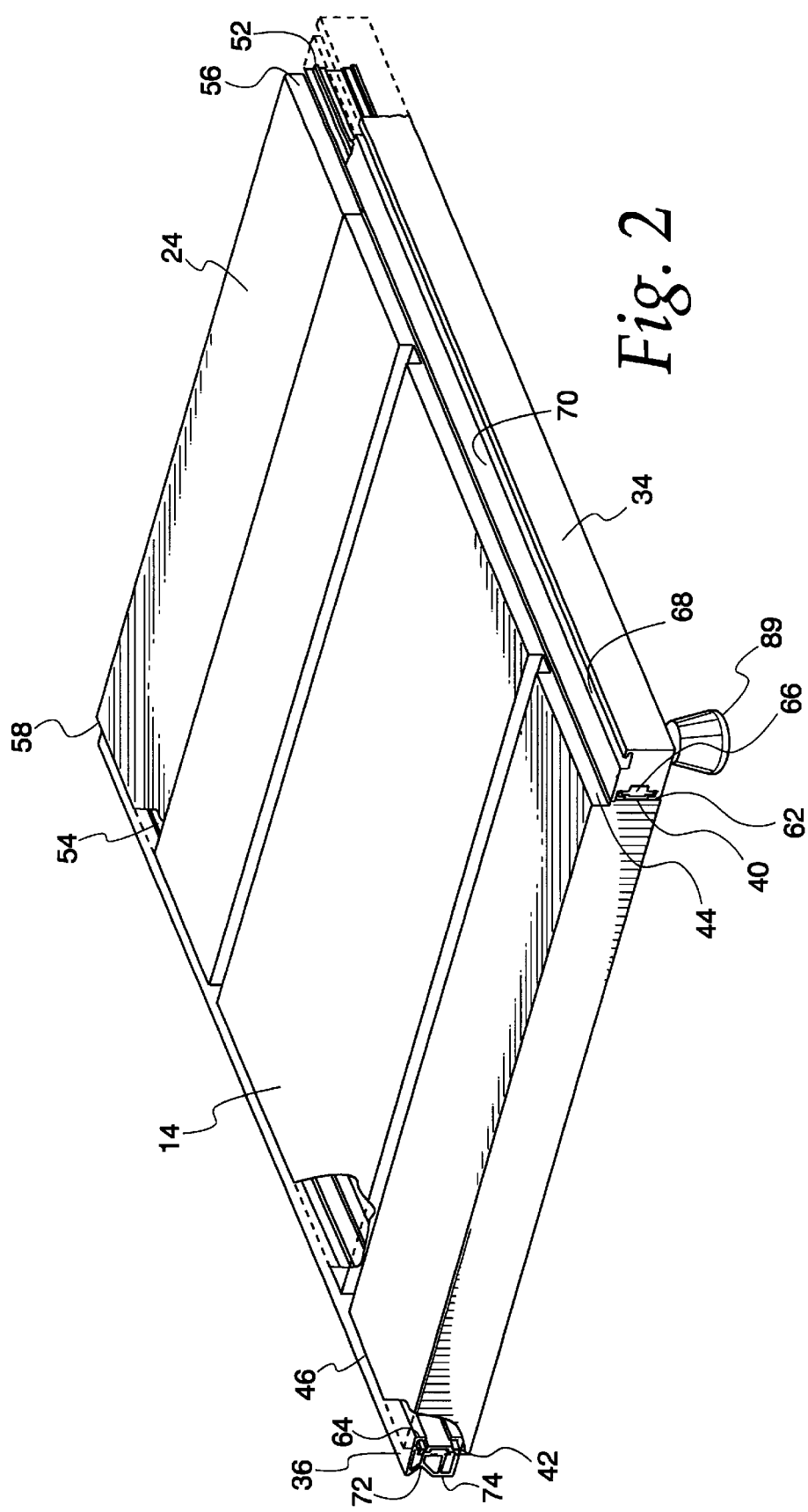

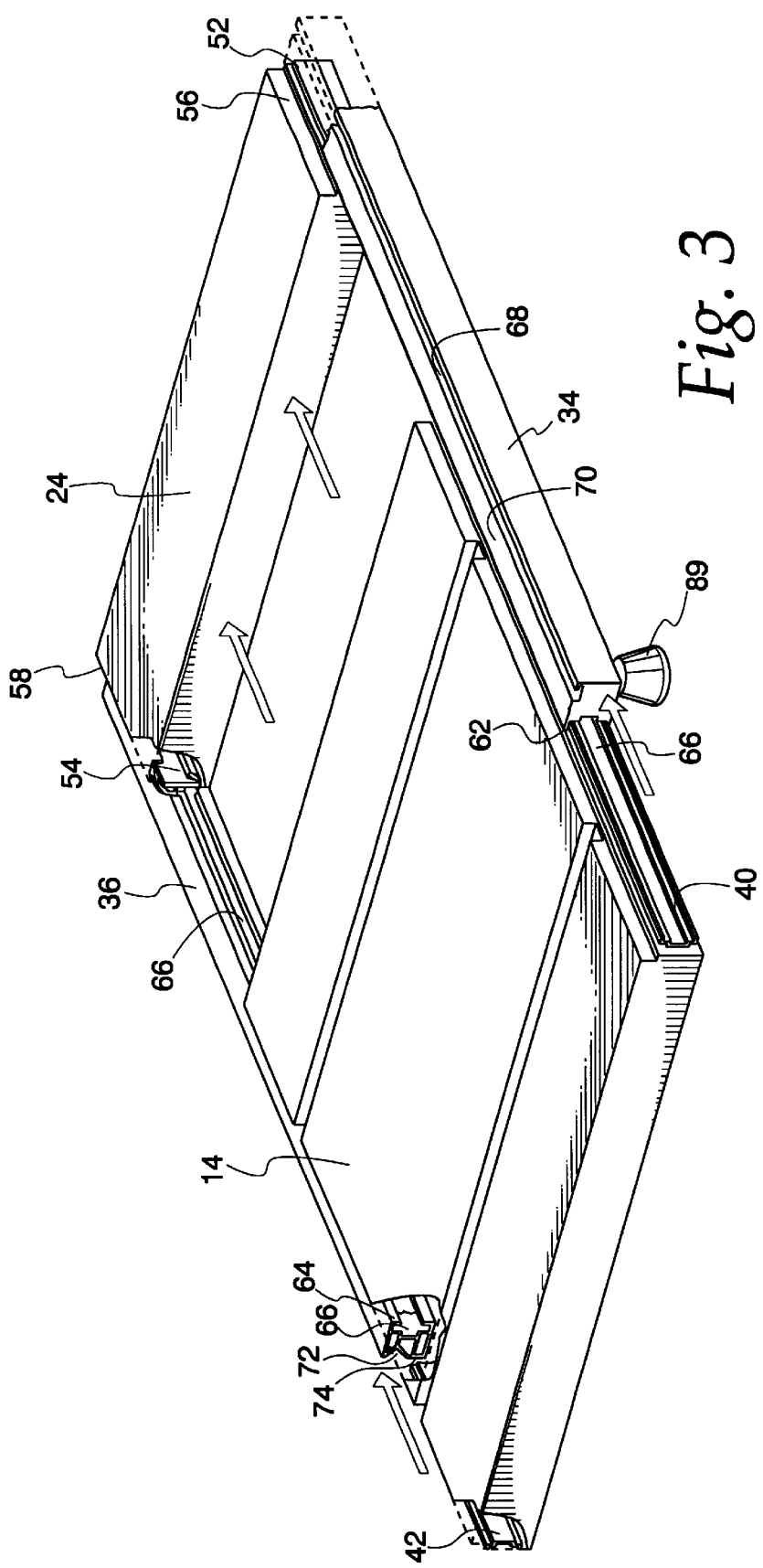

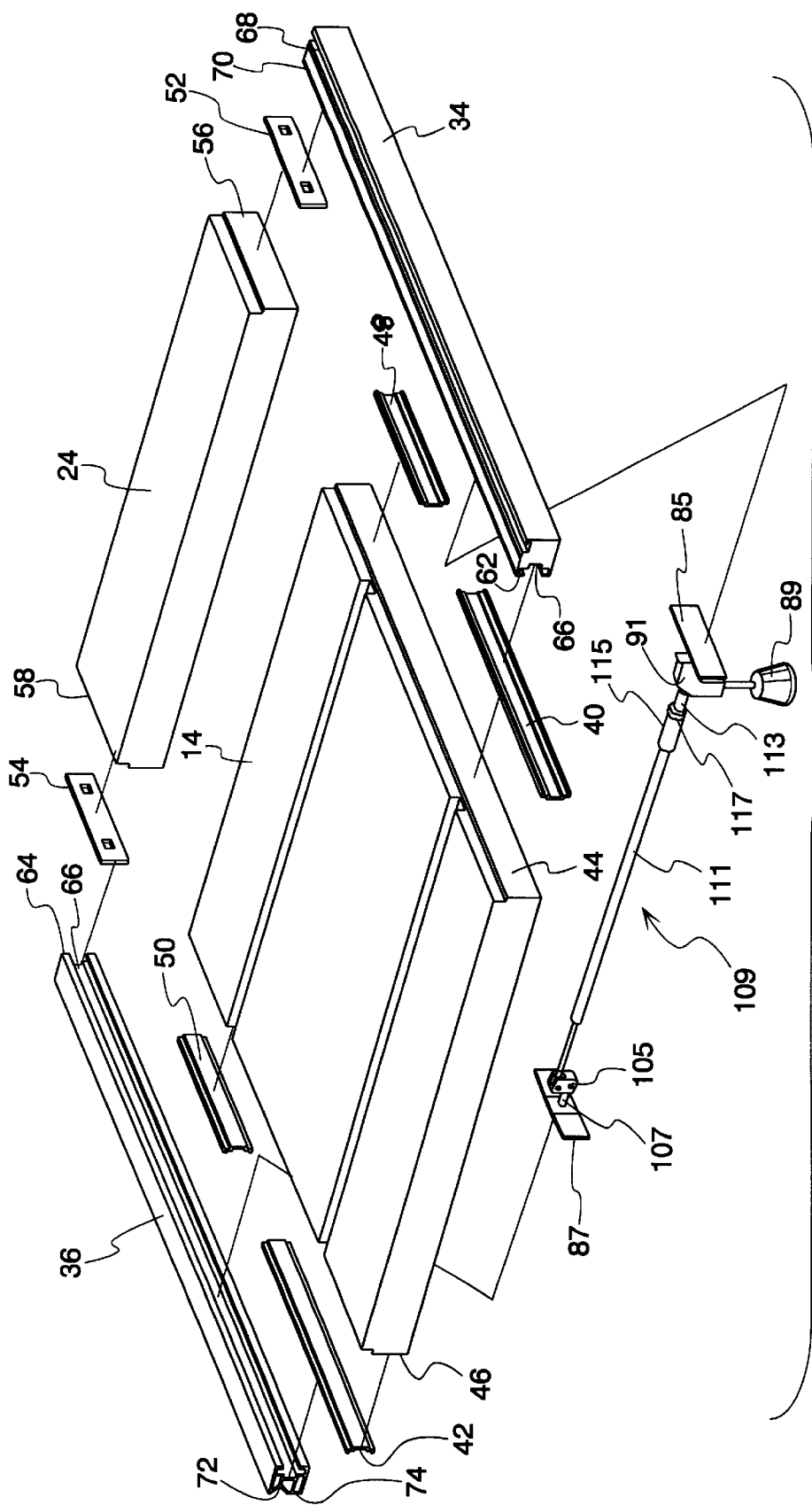

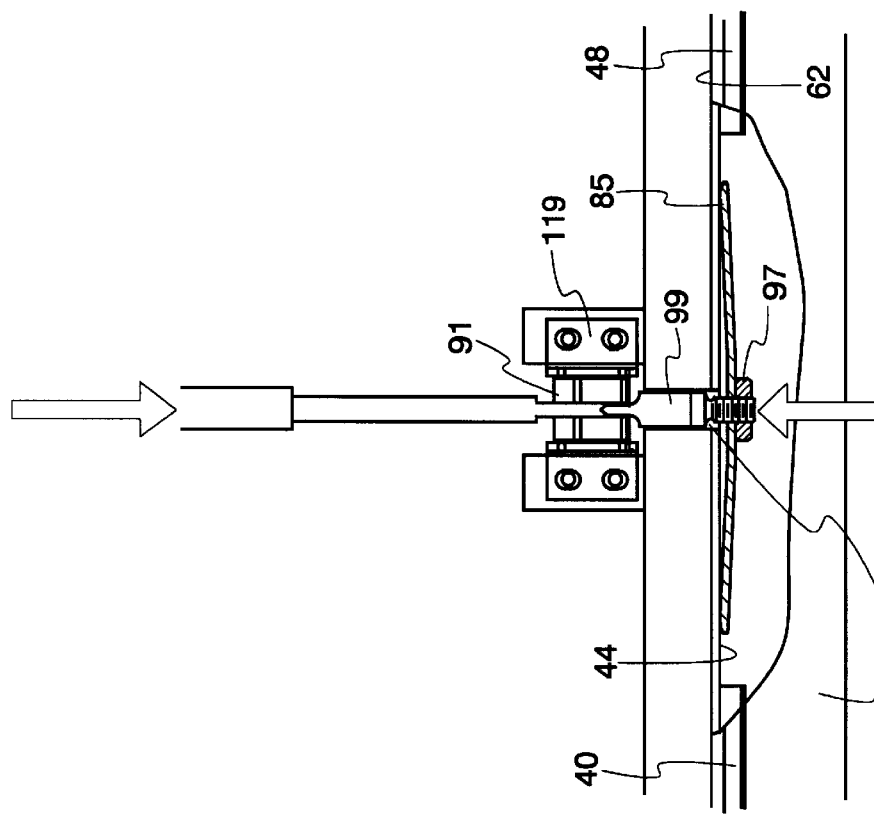
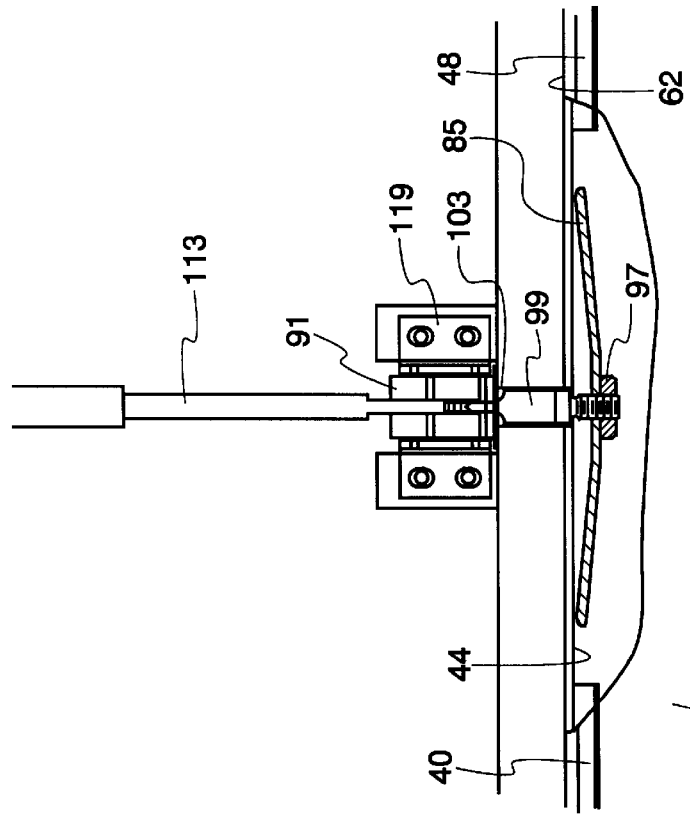

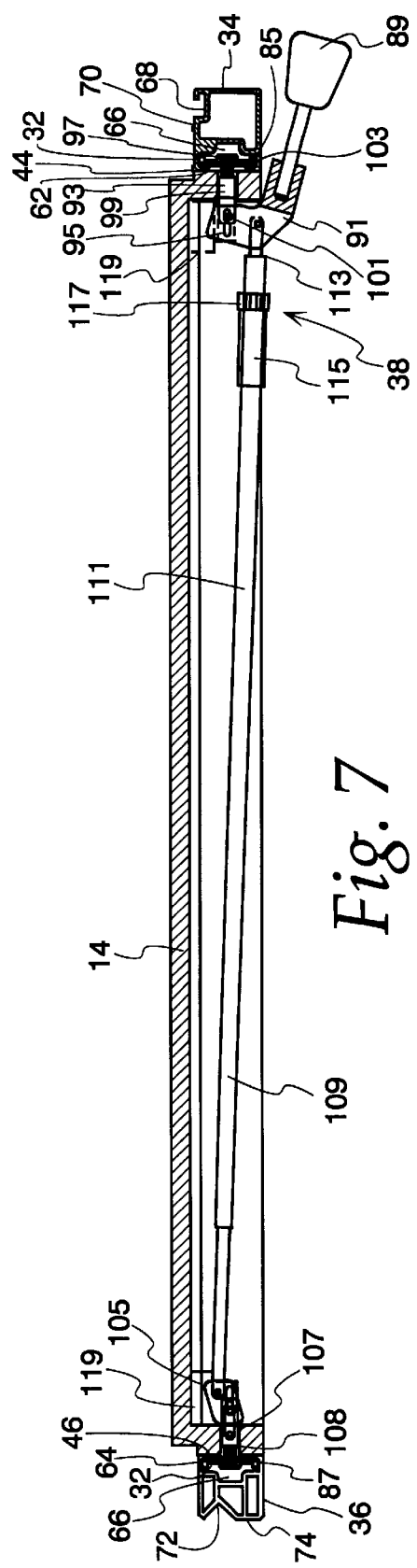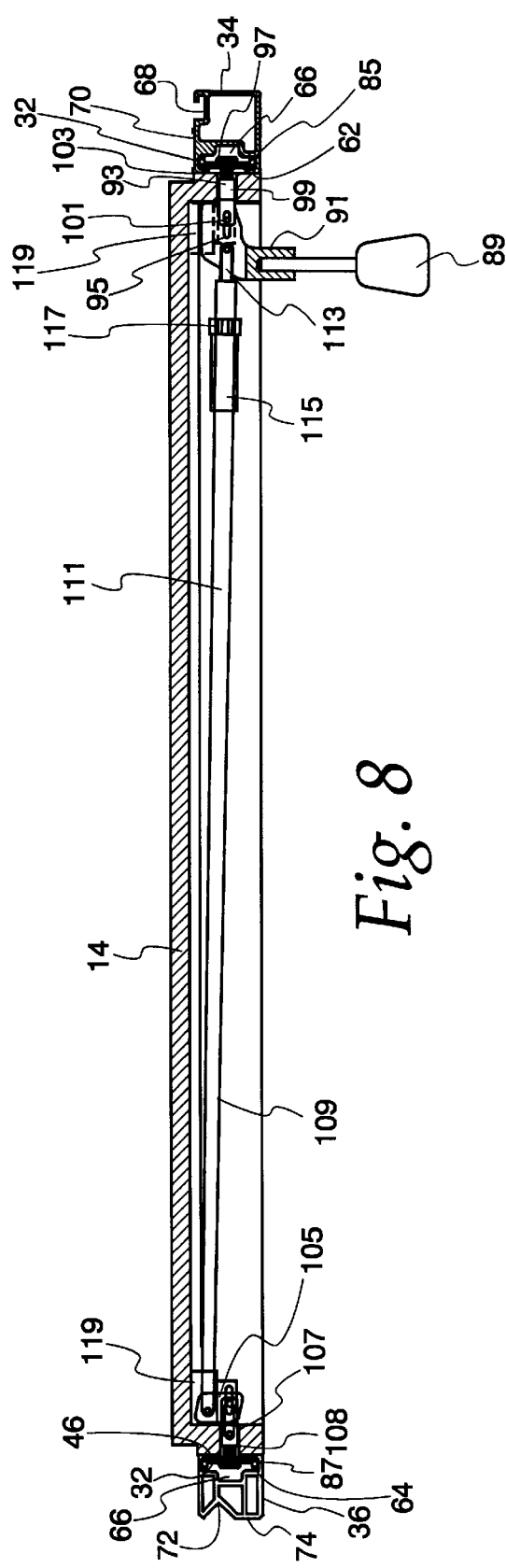

DUAL SLIDING RAIL AND LOCKING MECHANISM FOR USE WITH A TABLE SAW

BACKGROUND OF THE INVENTION

1. Field of the Invention

The present invention relates to a table saw having an auxiliary table surface, and in particular, to the dual sliding rail mechanism for movably attaching the auxiliary table surface to the table saw.

2. Scope of the Prior Art

Table saws of various designs include a frame and an upper surface having an opening through which a blade extends. The upper surface supports a material, such as wood, as it is pushed for cutting by the blade. Table saws have traditionally been stand-alone pieces of equipment that are used in workshops or other locations. Because most stand-alone table saws are used in large open spaces, the dimensions of the table saw can be large enough to support materials of various sizes. Regardless of how large the upper surface of the table saw is, however, there have been numerous means to expand the cutting surface. These different methods include sliding tables extending from a side of the table saw, separate auxiliary surfaces that are secured to the side of the cutting surface, and a table surface that folds from any edge of the table saw.

Tables that are used in workshops are not readily moved from one location to another. At construction sites and other locales, however, it is useful to have a table saw that can be easily moved from one location to another and between different construction sites. Accordingly, smaller table saws have been designed. These table saws use lighter materials and have reduced the dimensions of the frame and the upper surface to thereby reduce the size and weight of the table saw. Thus, there now exist portable table saws. The portable table saws also use a separable folding table to support the table saw at the correct height for operation.

Even though portable table saws are used at construction sites, the need to use the saw for large pieces of material has not lessened. In order for the table saw to efficiently cut a large piece of material, such as an four-foot-by-eight-foot piece of plywood, the material must be adequately supported by the upper surface. Otherwise, less than accurate cuts will be made thereby wasting valuable materials. Accordingly, portable table saws often include an auxiliary table surface that expands the usable work space provided by just the table saw. Because the table saw must be portable, it is more beneficial to have an auxiliary table surface that is movable attached to the portable table saw. This arrangement reduces the number of parts that must be moved from one location to another and makes the portable table saw easier to use.

In addition, other types of tables utilize auxiliary table surfaces. Accordingly, there are numerous different configurations and arrangements used to connect an auxiliary table surface to the frame and upper cutting surface of a portable table saw. Various different configurations have been used to connect a detachable auxiliary table surface to a side edge of a table saw's upper cutting surface. These configurations include bolting the auxiliary table surface to the upper surface such that the side surfaces of the auxiliary table and the upper surface are adjacent to each other. Other arrangements use slots in the upper surface or frame of the table saw and tabs on the auxiliary table such that the tabs fit into the slots to attach the auxiliary table to the table saw. Screws can be used in conjunction with the tab and slot design to secure the auxiliary table in place. Similarly, auxiliary tables can be connected to the side of the upper surface so that the auxiliary table folds between an extended position to increase the size of the working surface and a lower position where the auxiliary table rests against the side of the frame. The prior art arrangements, however, do not allow the user to expand or contract the working area of the upper surface and auxiliary table depending on the size of the material being cut or the work being performed.

In other table designs, the upper surface of the table is divided into sections where one section slides on rails formed in the table frame. When the movable section is moved to an expanded position, a separate auxiliary table can be added between the sections. A corollary to that design is to have rails that can be pulled from the upper surface or frame of the table saw and then to place a separate auxiliary table surface on the rails. These configurations do not necessarily provide for mechanisms to secure the rails in any position or mechanisms to secure the auxiliary table to the rails. If such a mechanism is provided, it is not an integral part of the table. In addition, the configurations rely on the use of a separable auxiliary table surface, which can be lost or broken so that it does not fit properly on the rails.

Table saws have also been configured with rails that are attached to the front and rear edge surfaces of the upper surface. These rails extend beyond at least one side end of the table saw. An auxiliary table surface can be movable attached to the rail so that the auxiliary table moves along the rail between a position adjacent the upper surface of the table saw and a position at the end of the rails. A lever or other locking mechanism can be used to secure the auxiliary table in any position between the two end positions.

In an alternative embodiment, the auxiliary table uses a rack and pinion design to move between the adjacent position and the extended position. In this embodiment, the rails include a rack and the auxiliary table is connected to the rails by a mechanism including a knob and a pinion. As known in the art, the knob rotates the pinion so that the auxiliary table moves along the rack to a designated position. A locking mechanism can be provided on the knob and pinion mechanism to secure the auxiliary table in any position along the rail. Such a locking mechanism can include a pin or post that pushes against the rail thereby making it difficult for the pinion to move along the rack. The pin is connected to a lever so that the pin can move between a locked position and a released position. The configurations that include a rail do not efficiently reduce the size of the table saw because the rails extend from the sides of the table saw therefore not effectively reducing the overall dimensions of a portable table saw. The rails can also make it difficult to move the portable table saw because they are awkward and can catch on other materials.

The rack and pinion configuration can also be arranged so that the rail and the rack is secured to the auxiliary table such that the rotation of the pinion along the rack moves the rail and the auxiliary table between an adjacent position against the upper surface and an extended position away from the table saw. Although the rack and pinion design functions sufficiently, it requires expensive parts and materials for it to work properly. In addition, the locking mechanisms do not necessarily adequately secure the auxiliary table in a position.

SUMMARY OF THE INVENTION

In view of the foregoing, it is an object of the present invention to develop a portable saw that has a movable auxiliary table that overcomes the deficiencies of the prior art. What is desired is an auxiliary table that moves between multiple positions, that can be secured easily in any such position, that does not unnecessarily increase the weight or general dimensions of the table saw, and that is useful. It is also a goal to have an auxiliary table that is easy to use and increases the work space of the portable table saw.

The present invention relates to a table saw that includes a dual sliding rail and locking mechanism to movably connect an auxiliary table to a portable table saw. The table saw used with the mechanism includes a frame portion and upper cutting surface. A blade extends through an opening in the upper surface to cut wood or other material. The upper surface is used to support the material as it is pushed on the table saw and cut by the blade. Front and rear edge surfaces extend perpendicularly from the front and rear edges of the upper surface. The table saw also includes an auxiliary table that is movable between a first position adjacent to the upper surface of the table saw and a second position separated from the table saw. In the second position, a gap is provided between the table saw and the auxiliary table.

A first set of at least two support brackets is connected to the front and rear edges of the upper surface, respectively. The first set of support brackets is positioned on the front and rear edges towards a first end of the upper surface. A second set of at least two support brackets are connected to the front and rear edges of the upper surface, respectively, towards a second and opposing end of the upper surface. The first and second set of support brackets are separated by a space or gap. The first and second set of support brackets have a modified C-shaped cross-section.

The present invention also includes a front and rear elongated rail. The front and rear rail includes a channel formed along at least one longitudinal edge. The channel has an outer portion along the edge of the rails and a wider lower edge within the rails. Towards the respective edge of the rails the channel gives the rail an C-shape. The shape and dimension of the channel is designed so that the first and second set of support brackets fit within the channel so that they easily slide.

The auxiliary table includes a set of at least two mounting brackets. The auxiliary mounting brackets are also designed to fit within the channel. The auxiliary mounting brackets are mounted within the channel and to the auxiliary table so that the front and rear rails are secured, or affixed, to the auxiliary table. As the auxiliary table is moved between the first and second positions, the first and second set of support brackets slide through the channel while maintaining a connection between the table saw and the auxiliary table. A stop can be provided within the channel or on the support brackets so that the rail cannot be separated from the support brackets.

In order to secure the auxiliary table in any location between the first and second position, the present invention includes a locking mechanism. The locking system includes a front and rear locking plate, which is made of spring steel or other suitable material. Each locking plate is slidably arranged within the channel of the front and rear rail and is placed in the gap between the first and second support brackets. The locking plates are designed to move laterally within the channel between a locked position and an open position. In the locked position, the locking plate is set tight against the walls of the channel and into the rail thereby preventing the rail from sliding over the locking plate and therefore over the first and second support brackets. In the open position, the locking plate is released, or loosened, from the walls of the channel thereby allowing the rail to slide over the locking plate and the first and second support brackets.

The locking mechanism also includes a lever, which is placed within easy reach on the frame, to move the locking plate between the locked and open positions. The lever is connected to one end of an inverted L-shaped cam. The end of the cam's foot portion includes a slot. A link connects the cam to the front locking plate. One end of the link is movably attached within the cam slot by a pin. The opposing end of the link is attached to the front locking plate.

The locking mechanism also includes a rear cam that has a slot formed therein towards the lower edge. The rear cam is connected to the rear locking plate by a link similar to how the front locking plate is connected to front cam. A rod is provided that is pivotally connected at one end to the upper end of the rear cam and at the other end to the vertex of the front cam. When the lever is in the lower position, the front cam positions the front locking plate in the locking position, and the rod positions the rear locking plate into the locking position. When the lever is moved into an upper position, the front cam rotates to move the link, and therefore the front cam is moved into the released position. In addition, the rotation of the front cam moves the rod so that the rear cam rotates to move the link and, therefore, moves the rear cam into the released position.

In view of the foregoing, the present invention has numerous advantages over the prior art. The dual sliding rail mechanism is simple to use and is made of inexpensive materials. In addition, the manufacture of the various components is inexpensive. The construction of the dual sliding rail mechanism also does not add unnecessary weight to the table saw thereby allowing the saw to be portable. The configuration of the locking mechanism, and in particular, the use and dimensions of the locking plates, ensures that the auxiliary table is secured in a locked position. Moreover, the slidable relationship between the rail and the support brackets and the locking plate allow the auxiliary table to move easily and smoothly between positions. Furthermore, the support brackets and the rail provide adequate support for the auxiliary table when it is in an extended position.

These and numerous other features and advantages of the present invention will become readily apparent from the following description, the accompanying drawings and the appended claims.

BRIEF DESCRIPTION OF THE DRAWINGS

FIG. 2 illustrates the upper surface of the table saw having cut away sections of the dual sliding rail mechanism where the auxiliary table is in the first position;

FIG. 3 illustrates the upper surface of the table saw having a cut away section of the dual sliding rail mechanism where the auxiliary table is in the second position;

FIG. 4 is an exploded view showing the components of the dual sliding rail mechanism of the present invention;

FIG. 5 is a top view of the locking plate in the released position;

FIG. 6 is a top view of the locking plate in the locked position;

FIG. 7 illustrates a cross-sectional view of dual sliding rail mechanism where the lever is in the released position;

FIG. 8 illustrates a cross-sectional view of the dual sliding rail mechanism as shown in FIG. 5 where the lever is in the locked position;

DETAILED DESCRIPTION OF THE PREFERRED EMBODIMENT

Figure 1:
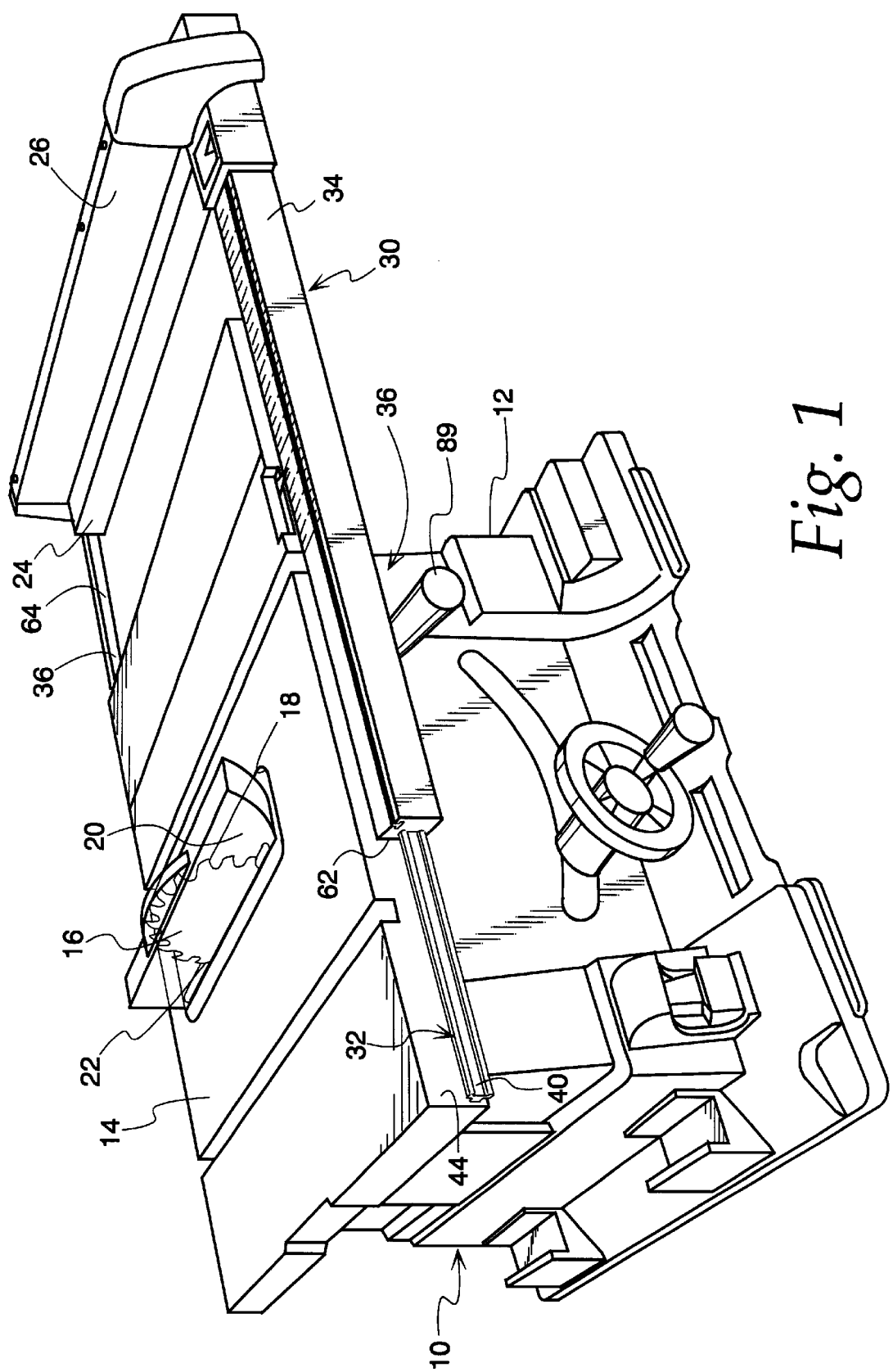
FIG. 1 illustrates a table saw that incorporates the dual sliding rail mechanism of the present invention.

FIG. 1 illustrates a table saw 10 that incorporates the dual sliding rail mechanism made in accordance with the principles of the present invention. The table saw 10 includes a frame 12 and an upper cutting surface 14 on which a material, such as wood, is placed to be cut by a blade 16. As seen, the blade 16 extends through an opening 18 in the upper cutting surface 14. The opening 18 is closed by a plate 20. As known to those skilled in the art, table saw 10 includes a motor (not shown) that rotates the blade 16 at sufficient speed so that the blade cuts the material. The table saw 10 of the present invention includes an auxiliary table 24 that is movable between a first position adjacent to the upper surface 14 and a second position extended away from the upper surface 14. FIGS. 2 and 3 illustrate the auxiliary table in the first position and the second position, respectively. In addition, the table saw can include a rip fence 26 to assist in the cutting of the material.

The present invention is directed towards a dual sliding rail mechanism 30 of the type shown in the Figures. The purpose of the dual sliding rail mechanism is to allow the auxiliary 20 table 24 to move between the first position and the second position and to lock the auxiliary table in any number of different positions between those positions. The dual sliding rail mechanism of the present invention includes a series of support brackets 32, a front rail 34, a rear rail 36, and a locking mechanism 38. The dual sliding rail mechanism 30 is designed for the front and rear rail 34, 36 to slide along the support brackets 32, and the locking mechanism 38 is used to secure the front and rear rails 34, 36, and therefore auxiliary table 24, in any location between the first and second positions along the support brackets 32.

As seen in the Figures, and in particular FIG. 4, support brackets 32 are made up of at least a first set of support brackets that includes two support brackets 40 and 42. Support brackets 40 and 42 are connected towards one end of the front edge surface 44 of the upper surface 14 and the rear edge surface 46 of upper surface 14, respectively. In the preferred embodiment, support brackets 32 include a second set of at least support brackets 48, 50. Similar to the first set of support brackets, the second support bracket 48 is secured to the front edge surface 44, and the second support bracket 50 is secured to the rear edge surface 46 towards the opposing end of the upper surface 14. The first and second set of support brackets are secured to the upper surface using screws (not shown) or other suitable mechanisms so that the support brackets 32 are rigidly connected to the upper surface 14. The first and second set of support brackets are separated on the front and rear surfaces, respectively, by a space or a gap.

In addition, the present invention includes a set of at least two auxiliary mounting brackets 52 and 54. The auxiliary mounting bracket 52 is secured to the front edge surface 56 of the auxiliary table 24. The auxiliary mounting bracket 54 is secured to the rear edge surface 58 of the auxiliary table 24. Similar to the first and second set of support brackets, the auxiliary mounting brackets 52, 54 are secured by bolts (not shown) or other suitable means so that the mounting brackets cannot be removed from the auxiliary table 24.

The support brackets 32 are made of metal, plastic or composite material that will permit the rails 34, 36 to smoothly slide there over. The support brackets 32 can be coated with a suitable material to ensure that the rails slide properly. The mounting brackets 52, 54 can be made of the same suitable material although those brackets do not need to be coated as the rails 34 and 36 do not slide over the mounting brackets. As seen in the Figures, the support brackets 32 have a modified C-shape with a center portion which fits against the edge surfaces and upper and lower lip portion.

The rails 34 and 36 have a generally elongated shape. In the preferred embodiment, the rails 34, 36 are extrusions made of any suitable material such as steel or a composite. The length of the rails 34, 36 is essentially equal to the length of an edge surface of the upper cutting surface 14 and an edge surface of the auxiliary table 24. Thus, when the auxiliary table 24 is in the first position adjacent to the upper cutting surface 14, the rail extends between one outer side edge of the upper cutting surface 14 and an opposing outer side end of auxiliary table 24. As seen in the Figures, the rails 34 and 36 have a generally rectangular cross-sectional shape. In an assembled embodiment of the present invention, an inner edge 62, 64 of each rail 34, 36, respectively, is positioned adjacent the front and rear edge surfaces 44, 46 of the upper cutting surface 14 and the front and rear edge surfaces 56, 58 of the auxiliary table 24. Each inner edge 62, 64 includes an elongated channel 66 which extends between the two ends of each channel. The channel has an outer portion that is adjacent the inner edges 62, 64 and a wider inner portion, thus giving the inner edges 62, 64 of the rails 34, 36 a generally C-shape cross-section. The channel 66 is sized so that the support brackets 32 and the brackets 52, 54 can be positioned within the channel 66. In particular, the bracket's lips fit within the inner portion and the bracket's center portion fits within the outer portion. The channel's dimensions are slightly larger than the size of the support brackets 32 so that the support brackets 32 can slide within the channel.

In addition, the front rail 34 includes an elongated slot 68 along the upper edge 70 of the front rail 34. An indent 72 is formed along the outer edge 74 of the rear rail 36. The elongated slot 68 and the indent 72 are used to position the rip fence 26 along the upper cutting surface 14 and the auxiliary table 24.

As described, the mounting brackets 52 and 54 are secured to the auxiliary table 24 and are positioned within the channels 66 of the rails 34 and 36. In order for the auxiliary table to move between the first and second positions, the mounting brackets 52, 54 are sized to fit in the channel so that the rails 34, 36 do not slide over the mounting brackets 52, 54. The mounting brackets can be secured to the rails by a suitable mechanism, such as a bolt, or the mounting brackets can be press fitted into the rail thereby securing the rails 34, 36 to the auxiliary table 24. Thus, when the auxiliary table 24 is moved between the first and second positions, the rails 32 slide over the support brackets 32.

Figure 10:
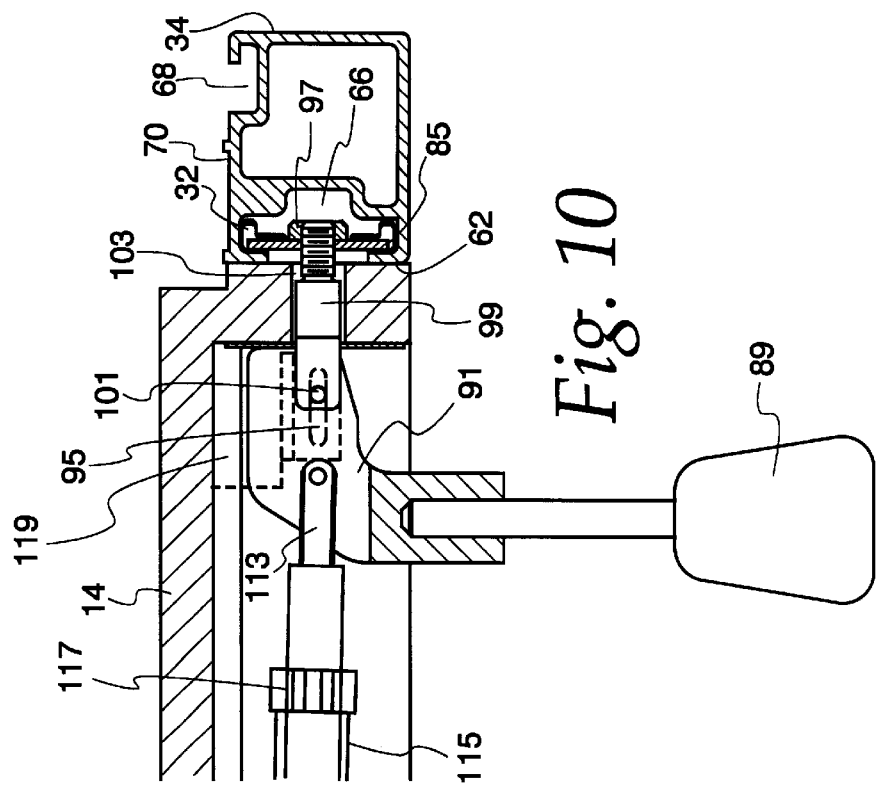
FIG. 10 is an enlarged view of the lever in the locked position along the front edge surface.

The locking mechanism 38 of the present invention is used to secure the auxiliary table 24 in any location between the first and second positions as the rails 34, 36 slide along the support brackets 32. In the preferred embodiment, the locking mechanism includes a front locking plate 85 and a rear locking plate 87. It will be appreciated by one skilled in the art that the present invention can operate with only one locking plate. The locking plates 85, 87 are made of spring steel or other suitable flexible material. As seen in FIG. 4, the locking plates have a generally rectangular shape, and as seen in FIGS. 5 and 6, have a slightly curved cross-section. The degree of curve is small enough so that the locking plates 85 and 87 fit within the channel 66 such that there is enough clearance for the rails 34 and 36 to slide over the locking plates 85 and 87. The cross-sectional shape of the locking plates allows the locking plates 85, 87 to laterally move within the channel 66 between a release position and a lock position. In the released position, the locking plates 85 and 87 are in a relaxed position, giving the locking plates the generally arched shaped cross-section. In the locked position, the locking plate is pulled firm against the inner walls of the channel 66 which in turn pulls the entire rail surface against the table surface to secure the auxiliary table 24 in a location between the first and second positions. As seen in FIG. 10, the cross-sectional shape of the locking plates 85, 87 is reduced so that the locking plate is approximately flat. This shape increases the cross-sectional area of the locking plates 85, 87 that are pulled firm against the walls of the channel 66.

The locking plates 85, 87 are moved between the locked position and the release position by a lever 89. As seen in FIG. 1, lever 89 is conveniently located underneath the upper cutting surface 14. The lever moves between an upper released position and a lower locked position to move the locking plates 85, 87 between the release position and the locked position.

Referring to FIGS. 7–10, the front locking plate 85 is connected to the lever 89 by a front cam 91 and a front link 93. The front cam 91 has a generally inverted L-shape with the lever 89 connected towards the end of the leg portion. An elongated slot 95 is configured longitudinally along the foot of the front cam 91. In the preferred embodiment, the link 93 has a threaded head portion 97 that connects the link 93 to the front locking plate 85. The head portion is threaded into one end of a rod portion 99. The opposing end of the rod portion 99 is movably connected to the front cam 91 by a pin 101 that extends through the slot 95. In the assembled table saw, the rod 99 extends through a hole 103 formed in the front edge surface 44 of the upper cutting surface 14. The diameter of the hole 103 is slightly larger than the diameter of the rod 99 so that the rod can easily move through the hole.

The rear locking plate 87 is connected to a rear cam 85. Similar to the configuration towards the front edge of the saw, the rear cam 105 is movable connected to the rear locking plate 87 by a rear link 107. The rear link 107 includes a head portion and a rod portion. The head portion threads through the rear locking plate 87 into the rod portion, which extends through a hole 108 in the rear edge surface 46 of the upper cutting surface 14. The rear link 107 connects proximate the lower end of the rear cam 105. An elongated rod 109 is provided to move the rear cam 105, and therefore the rear locking plate 87, between a locked position and a released position. The elongated rod is connected at one end proximate the upper edge of the rear cam 105. The opposing end of the rod 109 is connected in the vicinity of the vertex of the front cam 91. The rod 109 is pivotally connected to both the front and rear cam 91, 105. Accordingly, the movement of the lever between the locked position and the release position moves the front cam. The rod 101 therefore moves as it end pivots about the moving front cam 91 and pivots to move the rear cam 95 and the rear locking plate 87.

In the preferred embodiment, the elongated rod 109 includes a first long portion 111 and a second shorter portion 113. The long rod portion 111 and the short rod portion 113 are connected by a coupler 115 and a nut 117. The coupler 115 can be a dual-threaded type such that the long rod 111 is threaded into one end and the short rod 113 is threaded into the opposing end. The nut 117 is a lock-nut type that holds the coupler 115 in place. The configuration of the elongated rod 109 using the long rod 111, short rod 113, coupler 115, and nut 117 allows the length of the elongated rod to be adjusted so that the locking mechanism 38 can efficiently move the locking plates 85, 87 between the locked position and the released position.

Referring back to FIGS. 5 and 6, the front cam 91 is held in place by a bracket 119 that is secured to the underside of the upper cutting surface 14. The rear cam 105 is similarly connected to the underside of the upper cutting surface 14 by brackets (not shown).

Figure 9:
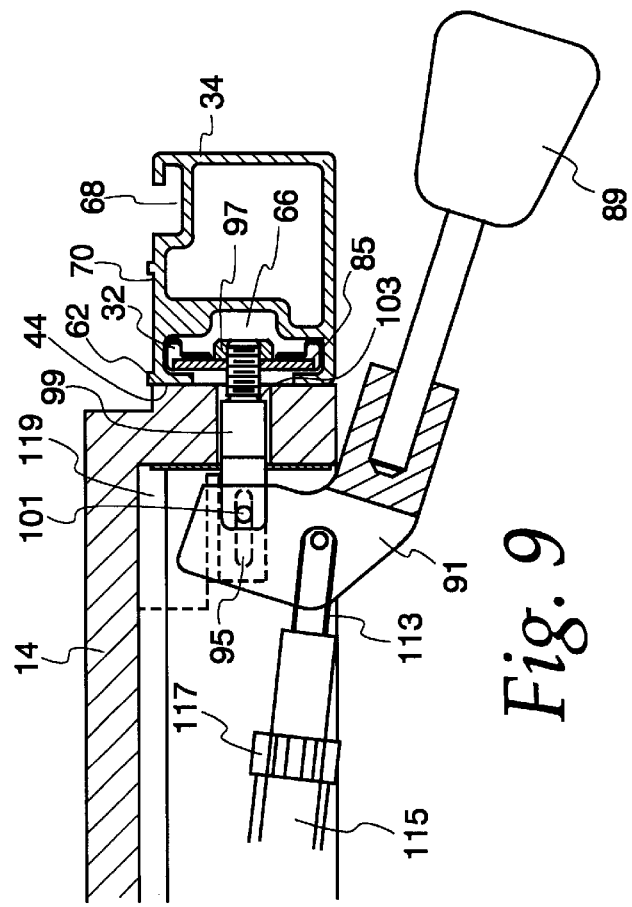
FIG. 9 is an enlarged view of the lever in the released position along the front edge surface.

In operation, the lever 89 moves between a locked, lower, position and a released, upper, position. As seen in FIG. 2, the auxiliary table 24 is in the first position adjacent to the upper cutting surface 14. Referring to FIGS. 5, 7 and 9, the auxiliary table 24 can be moved from the first position to the second position when the locking mechanism 38 is in the released position. In the released position, the locking plates 85, 87 are released from the edges of the channel 66 so that the rails can slide along the support brackets 32. A stop mechanism (not shown) of any known type can be used so that the rails 34, 36 cannot be removed from the support brackets 32, thereby providing the auxiliary table 24 to be a unitary piece with the table saw 10. The event of moving the lever 89 into the locked position, shown in FIGS. 6, 8 and 10, pushes the end of the front cam's foot portion against the inner wall of the front surface 44 and pulls the rod towards the rear surface 46, thereby pushing the rear cam 105 into a locked position. When the lever positions the front cam 91 and rear cam 105 into the locked position, the locking plates 85, 87 are firm against the inner surfaces of the channel 66 so that the entire surface of the rails 34, 36 no longer slide over the support brackets 32 but are locked against front and rear table surface 14. In the locked position, there is sufficient surface area of the locking plates against the walls of the channel 66 to prevent the movement of the rails 34, 36, and therefore the auxiliary table 24, along the support brackets 32.

As the lever 89 moves from the released position to the locked position, one end of the slot 95 pulls against the pin 101 and therefore the front link 93 so that the front locking plate is pulled firm against the walls of the channel 66. As the locking plate is made of a suitably flexible material, the locking plate 85 secures the rail 34 in a position. A similar operation occurs within the rear cam 105, rear lock 107 and rear locking plate 87.

When the lever 89 is moved from the locked position to the release position, the foot portion of the front cam 91 is released from the inner wall of the front surface 44. Thus, the front cam 91 releases the pin 101 from the end of the slot 95, and the pin 101 is therefore free to move within the slot 95 so that the link releases the locking plate 85 from the walls of the channel 66. Similarly, the rod pulls the upper end of the rear cam 85, thereby allowing the rear link 107 to release the rear locking plate 87 from the walls of the channel 66 in the rear rail 34.

Although the present invention has been described in considerable detail with reference to certain preferred versions, other versions are possible. Therefore, the spirit and scope of the appended claims should not be limited to the description of the preferred embodiment described.

What is claimed is:

1. A table saw having dual sliding rails and locking system, the table saw comprising:

a frame having an upper surface through which a blade extends to cut a material, the upper surface having a front and a rear edge extending between a first and a second side;

a front first support bracket secured to the front edge toward the first side of the surface;

a rear first support bracket secured to the rear front edge toward the first side of the surface;

a front second support bracket secured to the front edge toward the second side of the surface;

a rear second support bracket secured to the rear edge toward the second side of the surface;

an auxiliary surface for extending the upper surface of the frame, the auxiliary surface having a front and rear edge;

a front auxiliary mounting bracket secured to the front edge of the auxiliary surface;

a rear auxiliary mounting bracket secured to the rear front edge of the auxiliary surface;

a front rail having a channel formed in one elongated edge of the front rail, the front auxiliary mounting brackets being placed in the front rail channel towards one end thereof to secure the auxiliary surface to the front rail and the front first support bracket being slidably engaged in the channel towards an opposing end of the rail;

a rear rail having a channel formed in one elongated edge of the rear rail, the rear auxiliary mounting brackets being placed in the rear rail channel towards one end thereof to secure the auxiliary surface to the rear rail and the rear first and support bracket being slidably engaged in the channel towards an opposing end of the rail, and a locking system to lock the extension in a position such that the auxiliary surface can be moved relative the upper surface. the locking system comprising:

a front locking plate made of spring steel, the front locking plate being slidably arranged within the channel of the front rail and positioned between the first and second front support bracket, the front rail locking plate being laterally movable within the channel between a released position wherein the rail slides relative the first and second front support brackets and a locked position wherein the rail is locked in a position such that the auxiliary table is secured in a position relative the upper surface;

a rear locking plate made of spring steel, the rear locking plate being slidably arranged within the channel of the rear rail and positioned between the first and second rear support brackets, the rear rail locking plate being laterally movable within the channel between a released position wherein the rail slides relative the first and second rear support brackets and a locked position wherein the rail is locked in a position such that the auxiliary table is secured in a position relative the upper surface;

a lever;

a front cam connected to the front locking plates to move the plate;

a rear cam connected to the rear locking plates to move the plate, and a rod connected between the lever and the front and rear cams such that the movement of the lever from a first position in which the locking plates are in the locked position, to a second position moves the rod and thereby moves the cams to move the locking plates to an open position.

2. The table saw according to claim 1 wherein the front cam having a general inverted L-shape with the lever connected to a lower leg of the cam and the locking rail plate being connected to a foot at a distal end of the cam by a link and wherein the rod being connected to the cam at a vertex of the lower leg and foot, and wherein the rod connects to the rear cam at an upper end and the cam connecting to the rear locking plate by a link that slides through a slot in the lower end of the rear cam.

3. The table saw according to claim 2 wherein the rod comprising a long member and a short member wherein the long and short members are connected by a dual threaded coupler and a lock nut.

4. The table saw according to claim 1 further comprising a front and rear cam support bracket connected to an underside of the upper support to support the front and rear cam and allow the front and rear cams to move as the lever moves between the first and second position.

5. A table saw having a dual sliding rail and locking system, the table saw comprising:

a frame having a table surface through which a blade extends, the upper surface having a front and a rear edge surface extending between a first and a second side;

an auxiliary table surface movable between a first position adjacent the frame table surface and a second position separated from the frame table surface, the frame table surface having a front and a rear edge surface connected to the front and rear edges of the auxiliary table surface;

at least one rail secured to the auxiliary table surface and movably connected to the front and rear edge surfaces of the frame;

a locking mechanism connected to the frame and operating with the rail, the locking mechanism movable between a locked position wherein the auxiliary table surface is fixed in a position relative the frame table surface and a released position wherein the auxiliary table surface is movable between the first position and the second position.

6. The table saw according to claim 5 wherein the rail includes a channel on an edge of the rail facing the frame and auxiliary table surface and wherein the locking mechanism has a plate to fit in the channel, the plate moveable between the locked and a released position to lock the auxiliary table in the fixed position.

7. The table saw according to claim 6 further comprising:

a first front support bracket secured to the front edge of the frame wherein the front support bracket is slidably arranged within the channel, and a first rear support bracket secured to the rear edge of the frame wherein the rear support bracket is slidably arranged within the channel;

a front auxiliary mounting bracket secured to the front edges of the auxiliary table surface and secured within the channel to move the auxiliary table surface and the rail between the first and second position, and a rear auxiliary mounting bracket secured to the rear edge of the auxiliary table surface and secured within the channel to move the auxiliary table surface and the rail between the first and second position.

8. The table saw according to claim 7 further comprising a front second support bracket secured to the front edge of the frame and a rear second support bracket secured to the rear edge of the frame wherein the front and rear second support bracket are slidably arranged within the channels of the front and rear rail, respectively.

9. The table saw according to claim 5 wherein the locking mechanism comprising:

a locking plate being slidably arranged with the rail and movable between a released position wherein the rail slides over the locking plate and a locked position wherein the auxiliary table surface is locked in position between the first and second positions;

a cam movably connected to the locking plate;

a lever connected to the cam and movable between a first position in which the locking plate is in the locked position and a second position in which the locking plate is in the released position.

10. The table saw according to claim 9 further comprising cam support brackets connected to an underside of the upper surface for which the cam are movable connected to support the locking mechanism to the frame.

11. The table saw according to claim 9 wherein the locking mechanism further comprises a link to connect the locking plate and the cam.

12. The table saw according to claim 11 wherein the cam having an inverted L-shape wherein the lever is connected to the lower leg of the front cam, and the cam having a slot in the upper foot through which an end of the link moves as the lever moves between the first and second positions.

13. The table saw according to claim 6 wherein the plate is made of spring steel.

14. A table saw having a dual sliding rail and locking system, the table saw comprising:

a frame having a table surface through which a blade extends, the table surface having a front and a rear edge surface;

an auxiliary table surface movable between a first position adjacent the frame table surface and a second position separated from the frame table surface, the auxiliary table surface having a front and a rear edge surface;

at least one front support bracket connected to the front edge surface;

at least one rear support bracket connected to the rear edge surface;

a front rail;

a rear rail;

a locking mechanism having a front and a rear locking plate movable positioned within the front and rear rail, respectively, a lever movable between a locked position and released position, a front cam connected between the lever and the front locking plate and a rear cam connected to the rear locking plate such that when the lever is in the locked position the front and rear locking plate is secured against the rail to lock the auxiliary table surface in a position between the first and second position and when the lever is in the released position the front and rear locking plate is released from the rail thereby allowing the auxiliary table surface to slide between the first and second position.

15. The table saw according to claim 14 further comprising:

a front channel positioned along a longitudinal edge of the front rail wherein the front support bracket is slidable within the front channel and the front locking plate moves within the front channel, and a rear channel positioned along a longitudinal edge of the rear rail wherein the rear support bracket is slidable within the rear channel and the rear locking plate moves within the rear channel.

16. The table saw according to claim 15 further comprising:

a front auxiliary mounting bracket connected to the front edge of the auxiliary table surface, and a rear auxiliary mounting bracket connected to the rear edge of the auxiliary table, and wherein the auxiliary mounting brackets fit in the channel to secure the extension to the auxiliary table surface.

17. The table saw according to claim 14 wherein the front and the rear locking plates are made of spring steel.

18. The table saw according to claim 14 further comprising a rod connected between the front cam and the rear cam and the lever wherein the rod moves the front cam and the rear cam as the lever moves between the locked and the released position.

19. The table saw according to claim 18 wherein the front cam having a generally inverted L-shape with a lower leg at the front cam and the locking plate being connected to a foot of the cam by a link and wherein the rod being connected to the front cam at a vertex of the lower leg and foot by a peg, and wherein the rod connects to the rear cam at an upper end and the rear cam connects to the rear locking plate by a link that slides through a slot in a lower end at the rear cam.

20. The table saw according to claim 14 further comprising a front and rear cam support bracket connected to an underside of the upper support wherein the brackets support the front and rear cams and allow the cams to move as the lever moves between the locked and released position.

* * * * *